United States Patent [19]

Enkegaard

[11] 4,369,067
[45] Jan. 18, 1983

[54] METHOD OF AND PLANT FOR MANUFACTURING PULVEROUS OR GRANULAR MATERIAL

[75] Inventor: Torben Enkegaard, Copenhagen, Denmark

[73] Assignee: F. L. Smidth & Co.

[21] Appl. No.: 214,961

[22] Filed: Dec. 10, 1980

[51] Int. Cl.³ .............................................. C04B 7/02
[52] U.S. Cl. ..................................... 106/100; 432/14; 432/105; 432/106
[58] Field of Search .................. 106/100; 432/14, 105, 432/106

[56] References Cited

U.S. PATENT DOCUMENTS

| 4,110,915 | 9/1978 | Ghestem | 106/100 |
| 4,191,586 | 3/1980 | Dambrine | 106/100 |

FOREIGN PATENT DOCUMENTS

| 1469673 | 4/1977 | United Kingdom | 106/100 |
| 1508721 | 4/1978 | United Kingdom | 106/100 |

*Primary Examiner*—James Poer
*Attorney, Agent, or Firm*—Pennie & Edmonds

[57] ABSTRACT

A method is disclosed for manufacturing pulverous or granular material in a plant supplied with raw material, for example, cement raw meal, including a kiln for burning the raw material to be treated therein, a cooler coupled after the kiln for cooling the product treated in the kiln, a first preheater coupled before the kiln and heated with kiln exit gases, and a second preheater heated with spent cooling air. According to the preferred embodiment, the method comprises the steps of feeding all of the raw material to the second preheater, conveying all of the raw material preheated in the second preheater to the first preheater, and returning to the cooler for reuse therein, all of the cooling air cooled in the second preheater. A unique plant is disclosed for practicing the method of the invention. The method and plant promote fuel economy and eliminate or at least minimizes dedusting requirements in the manufacture of such pulverous or granular material.

12 Claims, 1 Drawing Figure

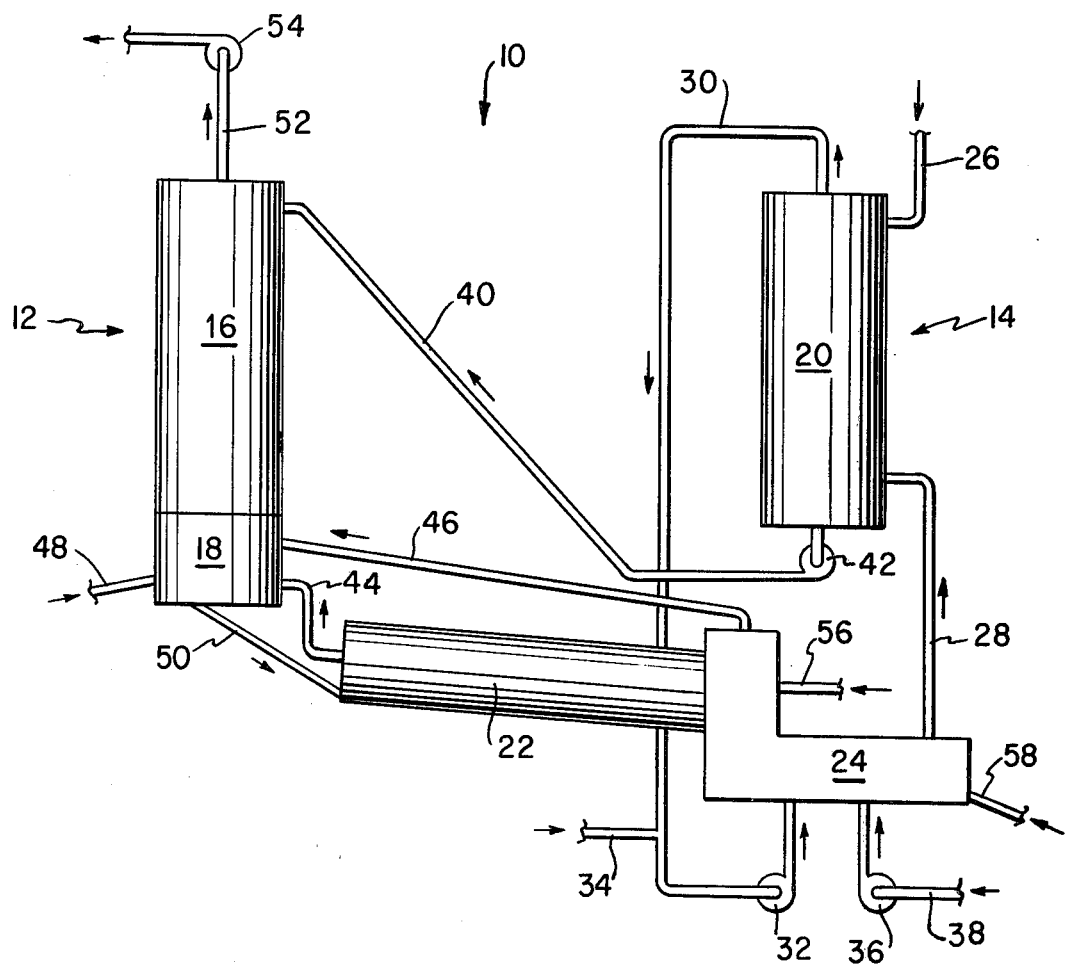

METHOD OF AND PLANT FOR MANUFACTURING PULVEROUS OR GRANULAR MATERIAL

TECHNICAL FIELD

This invention relates to the manufacture of pulverous or granular materials, for example cement, in accordance with the so-called dry process and in particular, in a kiln plant having two preheaters.

BACKGROUND ART

In a typical kiln plant having two preheaters one of which is heated by means of the kiln exit gases and the other one of which is heated by means of spent cooling air, a kiln and a cooler are coupled after the kiln for cooling the product treated in the kiln. The raw material treated in the preheater and heated by the kiln exit gases may either be passed directly from the preheater to the kiln or via a precalciner coupled to the preheater and precalcining the raw materials after their preheating. The preheaters, of a type which is known to those skilled in the art, for example shaft preheaters or cyclone preheaters, together with their outlet and inlet pipes and fans are herein respectively referred to as "the kiln string", covering the preheater heated by the kiln exit gases, and "the cooling air string", covering the preheater heated by spent cooling air from the cooler.

The cooler may be a grate cooler such as is commonly used in such plants, especially within the cement industry. This type of cooler has, unfortunately, the disadvantage that it requires an amount of cooling air substantially exceeding the amount of combustion air needed for and used in the combustion process in the kiln and possibly also the calciner. Thus, there is excess air from the cooler which represents a considerable heat loss and also a serious problem of dedusting and consequential pollution.

DISCLOSURE OF THE INVENTION

According to the invention a method is disclosed for manufacturing pulverous or granular materials in a plant supplied with raw material including a kiln for treating the raw material, cooling means coupled after the kiln for cooling the product treated in the kiln, a first preheater coupled before the kiln and heated with kiln exit gases, and a second preheater heated with spent cooling air, comprising feeding substantially all of the raw material to the second preheater, conveying substantially all of the material preheated in the second preheater to the first preheater, and returning substantially all of the cooling air cooled in the second preheater to the cooling means for reuse therein.

According to a preferred embodiment the invention relates to a method of manufacturing pulverous or granular material such as cement in a kiln plant comprising a first preheater heated by kiln exit gases, a kiln for burning and sintering of the raw materials, a cooler coupled after the kiln for cooling the product treated in the kiln, and a second preheater heated by spent cooling air from the cooler, substantially the whole of the air used in the second preheater and cooled therein as a result of the preheating of the raw material in the preheater is returned to the cooler in which it is reused for cooling the kiln product.

The invention also relates to a plant supplied with raw material for manufacturing pulverous or granular materials comprising a kiln for treating the raw material, cooling means coupled after the kiln for cooling the product treated in the kiln, a first preheater coupled before the kiln and heated with kiln exit gases, a second preheater heated with spent cooling air, means for feeding substantially all of the raw material to the second preheater, means for conveying substantially all of the raw material preheated in the second preheater to the first preheater, and means for returning substantially all of the cooling air in the second preheater to the cooler for reuse therein.

In a preferred embodiment the invention relates to a kiln plant for carrying out the above described method, the kiln plant comprising a first preheater heated by kiln exit gases, a kiln for burning and sintering of cement raw meal, a cooler coupled after the kiln for cooling the product from the kiln, a second preheater heated by spent cooling air from the cooler and means for returning substantially the whole of the cooled air from the second preheater to the cooler for reuse in cooling the kiln product.

Preferably, all the raw material is fed to the second preheater and after preheating in the second preheater is subsequently passed direct to the first preheater for further treatment therein. If desired, the preheated raw material from the first preheater may be precalcined in a precalciner before being passed to the kiln.

Alternatively, the supply of raw material may be apportioned between the two preheaters. Furthermore, some of the heated raw material from the second preheater could be passed direct to the precalciner or kiln, thus bypassing the first preheater.

By the method of the invention the whole of the excess air from a grate cooler can be utilized partly in the kiln and partly in the second preheater so that the heat loss problem is considerably reduced and the dedusting problem eliminated, the spent cooling air following a substantially closed circuit from the cooler through the cooling air preheater and back to the cooler, cooling of the air being achieved in the preheater by its giving of heat to the raw material. Fresh cooling air for supplementing the return air can be supplied to the cooler in the usual way. Thus, with a plant according to the invention, the dust precipitator capacity in the plant can be considerably reduced and, furthermore, plant economy is improved.

BRIEF DESCRIPTION OF THE DRAWING

The present invention is described in detail below with reference to the accompanying diagrammatic drawing of a kiln plant according to the present invention.

DESCRIPTION OF THE PREFERRED EMBODIMENTS

Referring to the drawing, a plant 10 has two preheater strings, a kiln string 12 and a cooling air string 14. The kiln string 12 comprises a preheater 16 and a calciner 18 and the cooling air string 14 has a preheater 20. The plant also includes a kiln 22 and a cooler 24 coupled after the kiln 22.

In use, all the raw material to be treated in the plant is fed to the preheater 20 through a pipe 26 and is preheated by cooling air passed to the preheater 20 from the cooler 24 by way of a pipe 28. The air passed to the preheater is hot, having been used to cool raw material from the kiln 22 and, after heating the raw material passed to the preheater 20 leaves the preheater 20 through a pipe 30 and is returned by way of a fan 32 to the cooler 24. If necessary, cold air is added at 34 to the returning air in the pipe 30. By means of a fan 36 atmospheric air further needed for cooling in the cooler 24 can be introduced through the pipe 38.

The raw material preheated in the preheater 20 is passed from the bottom of the preheater 20 through a pipe 40 by means of a pump 42 to the top of the preheater 16 for treatment therein. The raw material passes through the preheater 16 to the calciner 18 to which combustion air is supplied through a riser pipe 44 from the kiln 22 and through a pipe 46 from the cooler 24. Thus, the total amount of air supplied to the cooler 24 is split between the preheater strings 12 and 14, that being passed through the string 14 being recirculated.

Fuel for the calciner 18 is supplied at 48. Preheated and precalcined material is passed from the calciner 18 to the kiln inlet through a tube 50 and the kiln exit gases are extracted from the preheater 16 through the pipe 52 by means of a fan 54 and are then passed to a dust precipitator (not shown).

In the kiln 22 the preheated and precalcined material is sintered and further treated by being burnt in the kiln by means of a burner 56 at the lower end of the kiln 22. The treated material then passes to the cooler 26 in which it is cooled by the cold air and leaves the cooler through an outlet 58.

Calculations have shown that given an air temperature of approximately 350° C. in the pipe 28 and a consumption of 1.0 kg air/kg klinker, the temperature of the preheated raw material in the pipe 40 will be approximately 180° C. against the 60° C. which is the normal temperature of ground raw material fed to the preheater 12 from a raw material grinding plant and an appertaining hopper, whereas the temperature of the exit gases from the preheater 12 will be approximately 450° C. Thus, it can be seen that a substantial reduction in heat loss can be achieved.

I claim:

1. A method of manufacturing pulverous or granular materials in a plant supplied with raw material including a kiln for treating the raw material, cooling means coupled after said kiln for cooling the product treated in said kiln, a first preheater coupled before said kiln and heated with kiln exit gases, and a second preheater heated with spent cooling air, comprising feeding all of the raw material to said second preheater, conveying substantially all of the material preheated in said second preheater to said first preheater, and returning substantially all of the cooling air cooled in said second preheater to said cooling means for reuse therein.

2. A method of manufacturing pulverous or granular material in a kiln plant supplied with raw material including a kiln for burning and sintering the raw material to be treated therein, a cooler coupled after said kiln for cooling the product treated in said kiln, a first preheater coupled before said kiln and heated with kiln exit gases, and a second preheated heated with spent cooling air, comprising feeding all of the raw material supplied to the kiln plant to said second preheater so as to preheat the raw material therein by means of the spent cooling air, conveying all of the raw material preheated in said second preheater to said first preheater for further treatment therein, and returning to said cooler for reuse therein, all of the cooling air cooled in said second preheater as a result of preheating the raw material.

3. A method of manufacturing pulverous or granular material in a kiln plant supplied with raw material including a kiln for burning and sintering the raw material to be treated therein, a cooler coupled after said kiln for cooling the product treated in said kiln, a first preheater with an associated precalciner coupled before said kiln, said precalciner at least partially heated with kiln exit gases, and a second preheater heated with at least a first portion of spent cooling air, comprising feeding all of the raw material supplied to the kiln plant to said second preheater so as to preheat the raw material therein by means of the first portion of spent cooling air, conveying all of the raw material preheated in said second preheater to said first preheater for further treatment therein, and returning to said cooler for reuse therein, all of the first portion of spent cooling air cooled in said second preheater as a result of preheating the raw material.

4. The method according to claim 3 further comprising directing the remaining portion of the heated cooling air to the precalciner.

5. A method of manufacturing pulverous of granular materials such as cement in a kiln plant supplied with raw material including a kiln for burning and sintering the raw material to be treated therein, a cooler coupled after said kiln for cooling the product treated in the kiln, a first preheater with an associated precalciner coupled before said kiln, the precalciner heated with kiln exit gases, and a second preheater, comprising heating said second preheater with at least a first portion of spent cooling air from said cooler, supplying the remaining portion of spent cooling air to said precalciner, feeding all of the raw material supplied to the kiln plant to said second preheater so as to preheat the raw material therein by contact with said first portion of spent cooling air, conveying all of the raw material preheated in said second preheater to said first preheater for further treatment therein, and returning to said cooler for reuse therein, all of said first portion of spent cooling air cooled in said second preheater as a result of preheating the raw material therein, thereby substantially reducing heat losses and substantially minimizing or eliminating dedusting.

6. A method of manufacturing pulverous or granular materials, e.g., cement, in a kiln plant supplied with raw materials for said manufacture and comprising a first preheater with precalciner coupled before a kiln and heated by means of kiln exit gases, a kiln for burning and sintering of the materials treated, a cooler coupled after the kiln for cooling the product treated in the kiln, and a second preheater heated by means of spent cooling air, characterized in that all the raw material is fed to the second preheater, the raw material thus preheated in said second preheater subsequently being passed directly to said first preheater for further treatment in same, if desired followed by a precalcining in a precalciner and a final treatment in the kiln and the cooler, the total amount of cooling air used in said second preheater and cooled as a result of the preheating of the raw material in said preheater, hence being returned directly to the cooler in which it is reused.

7. A plant supplied with raw material for manufacturing pulverous or granular materials comprising a kiln for treating the raw material, cooling means coupled after said kiln for cooling the product treated in said kiln, a first preheater coupled before said kiln and heated with kiln exit gases, a second preheater heated with spent cooling air, means for feeding all of the raw material to said second preheater, means for conveying substantially all of the raw material preheated in said second preheater to said first preheater, and means for returning substantially all of the cooling air cooled from said second preheater to said cooling means for reuse therein.

8. A kiln plant supplied with raw material for manufacturing pulverous or granular materials comprising a kiln for burning and sintering the raw material to be treated therein, a cooler coupled after said kiln for cooling the product treated therein, a first preheater coupled before said kiln and heated with kiln exit gases, a second preheater heated with spent cooling air, means for feeding all of the raw material supplied to the kiln plant to said second preheater so as to preheat the raw material therein by means of the spent cooling air, means for conveying all of the raw material preheated in said second preheater to said first preheater for further treatment therein, and means for returning to said cooler for reuse therein, all of the cooling air cooled in said second preheater as a result of preheating the raw material.

9. A kiln plant supplied with raw materials for manufacturing pulverous or granular materials comprising a kiln for burning the raw material to be treated therein, a cooler coupled after said kiln for cooling the product treated in said kiln, a first preheater with an associated precalciner coupled before said kiln, the precalciner being at least partially heated with kiln exit gases, a second preheater heated with a first portion of spent cooling air from said cooler, means for feeding all of the raw material supplied to the kiln plant to said second preheater so as to preheat the raw material therein by means of the first portion of spent cooling air, means for conveying all of the raw material preheated in the second preheater to said first preheater for further heat treatment therein, and means for returning to said cooler for reuse therein, all of the first portion of spent cooling air cooled in said second preheater as a result of preheating the raw material therein.

10. The kiln plant according to claim 9 means for directing the remaining portion of the spent cooling air to said precalciner.

11. A kiln plant supplied with raw material for manufacturing pulverous or granular material such as cement comprising a kiln for burning and sintering the materials treated therein, a cooler coupled after said kiln for cooling the product treated in said kiln, a first preheater with an associated precalciner coupled before said kiln, the precalciner heated at least in part with kiln exit gases, a second preheater, means for supplying a first portion of spent cooling air from said cooler to said second preheater, means for supplying the remaining portion of spent cooling air to said precalciner, means for feeding all of the raw material supplied to the kiln plant to said second preheater so as to preheat the raw material therein by means of the first portion of spent cooling air, means for conveying all of the raw material preheated in said second preheater to said first preheater for further treatment therein, and means for returning all of the first portion of spent cooling air cooled from said second preheater to said cooler for reuse therein thereby substantially reducing heat losses and substantially eliminating the need for dedusting.

12. A kiln plant for manufacturing pulverous or granular materials, e.g., cement, in a kiln comprising a first preheater, if desired with a precalciner coupled before a kiln and heated by means of kiln exit gases, a kiln for burning and sintering of the materials treated, a cooler coupled after the kiln for cooling the product treated in the kiln, and a second preheater heated by means of spent cooling air, characterized by means for supplying all the raw material to be treated in the plant to said second preheater, the raw material thus preheated in said second preheater subsequently being passed directly to said first preheater by means for conveying the material thus treated in the second preheater direct to said first preheater for further treatment in the plant, if desired followed by a precalcining in a precalciner and a final treatment in the kiln and the cooler, the total amount of cooling air used in said second preheater and cooled as a result of the preheating of the raw material in said preheater, hence being returned directly to the cooler in which it is reused by means for returning the total amount of spent and cooled cooling air from the second preheater direct to the cooler.

* * * * *